(12) United States Patent
Rus

(10) Patent No.: US 6,860,231 B1
(45) Date of Patent: Mar. 1, 2005

(54) DEVICE FOR TRAINING CATS TO GO ON A TOILET

(76) Inventor: Serge Rus, 414 E. 65th St. Apt. 4H, New York, NY (US) 10021

(*) Notice: Subject to any disclaimer, the term of this patent is extended or adjusted under 35 U.S.C. 154(b) by 0 days.

(21) Appl. No.: 10/712,282

(22) Filed: Nov. 14, 2003

(51) Int. Cl.⁷ .............................................. A01K 29/00
(52) U.S. Cl. ........................ 119/162; 119/712; 119/165
(58) Field of Search ................. 119/712, 867, 119/161, 162, 165, 166, 168, 905

(56) References Cited

U.S. PATENT DOCUMENTS

| | | | | |
|---|---|---|---|---|
| 4,505,226 A | * | 3/1985 | Carlson | 119/166 |
| 5,325,815 A | * | 7/1994 | Gumpesberger | 119/166 |
| 5,564,366 A | * | 10/1996 | Hancock | 119/167 |
| 5,797,346 A | * | 8/1998 | Lewis | 119/166 |
| 6,408,790 B1 | * | 6/2002 | Maguire | 119/166 |

* cited by examiner

Primary Examiner—Son T. Nguyen
(74) Attorney, Agent, or Firm—I. Zborovsky

(57) ABSTRACT

A device for training cats to go on a toilet has a plurality of containers each having a hollow for accommodating a material onto which a cat urinate or defecate, the containers being inserted into one another so as to form an upper surface on which a cat can stand or sit, the containers being removable from one another so as to expose a throughgoing opening through which a cat can urinate or defecate, the containers being removable independently from one another so as to gradually expose throughgoing openings of different cross-sectional areas.

17 Claims, 4 Drawing Sheets

DEVICE FOR TRAINING CATS TO GO ON A TOILET

BACKGROUND OF THE INVENTION

The present invention relates to a device for training cats to go on the toilet.

Devices of the above mentioned type are known in the art. One of such devices is formed as a container with a flat surface, in which holes can be cut of different diameters so as to change periodically the diameter of the throughgoing hole and therefore to train a cat to an increasing diameter hole so that it eventually becomes accustom to urinate and defecate into such a relatively large hole, when a device is installed on the toilet. Such a device has however the disadvantage that the surface can not hold a material into which the cat defecates or urinates, such as litter, and the like. It is believed that the existing device can be further improved.

SUMMARY OF THE INVENTION

Accordingly, it is an object of the present invention to provide a device for training cats to go on a toilet, which is a further improvement of the existing devices.

In keeping with these objects and with others which will become apparent hereinafter, one feature of the present invention resides, briefly stated, in a device for training cats to go on a toilet, comprising a plurality of containers each having a hollow for accommodating a material onto which a cat urinate or defecate, said containers being inserted into one another so as to form an upper surface on which a cat can stand or sit, said containers being removable from one another so as to expose a throughgoing opening through which a cat can urinate or defecate, said containers being removable independently from one another so as to gradually expose throughgoing openings of different cross-sectional areas.

When a device is designed in accordance with the present invention, a person who trains a cat periodically removes corresponding containers so as to change a cross-sectional area of the device and to gradually make a cat accustomed to a changing cross-sectional area hole, so that eventually when a device with a large hole is installed on a toilet bowl the cat urinates and defecates into such a device.

The fact that the device includes a plurality of containers which are insertable into one another and removable from one another provides a sufficient volume in the device for a material in which a cat defecates and urinates, the device is also sturdy and reliably in operation, and also provides for a possibility of efficiently changing a throughflow cross-section of the opening in the device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
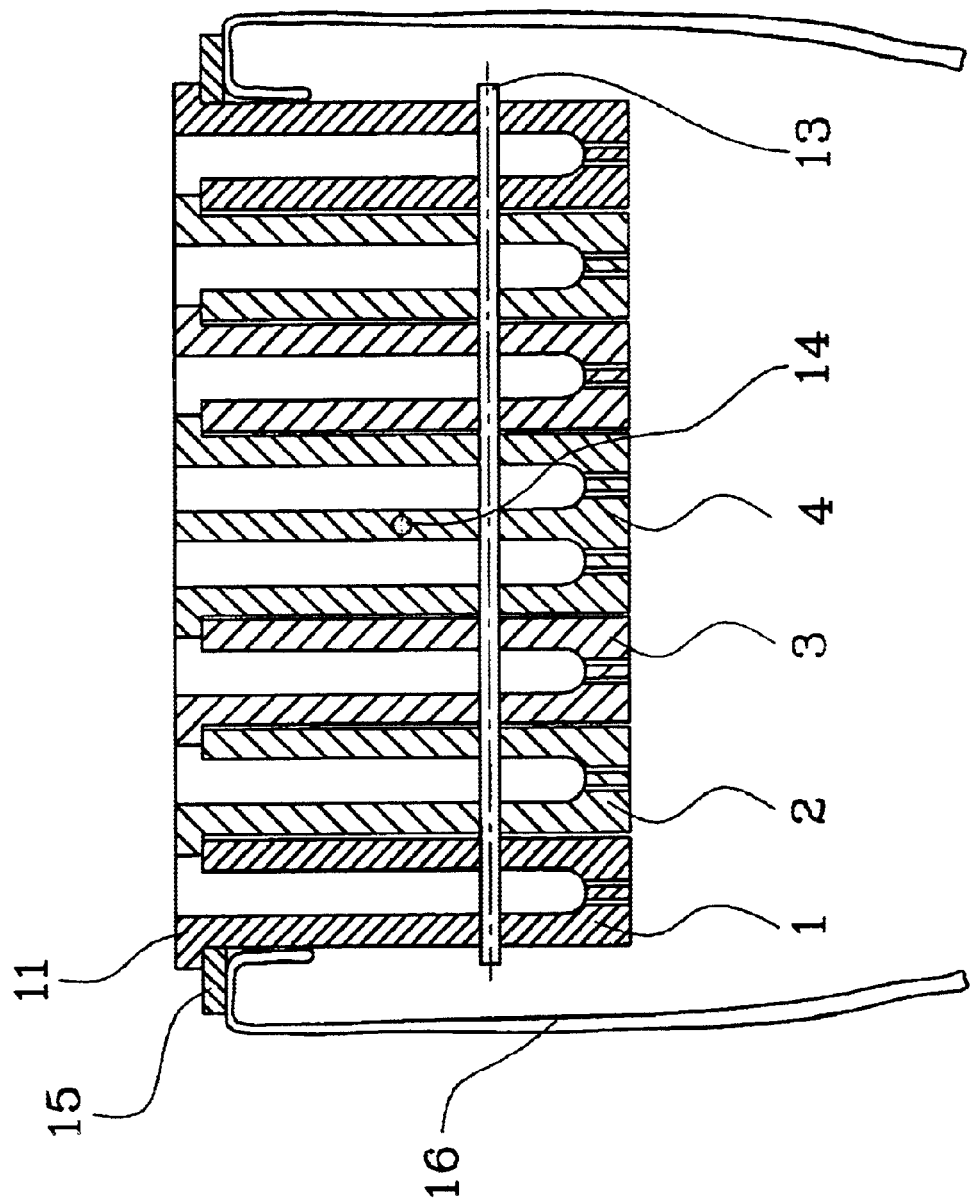
FIG. 1 is a view showing a cross-section of a device for training cats to go on a toilet in accordance with the present invention.
Figure 2:
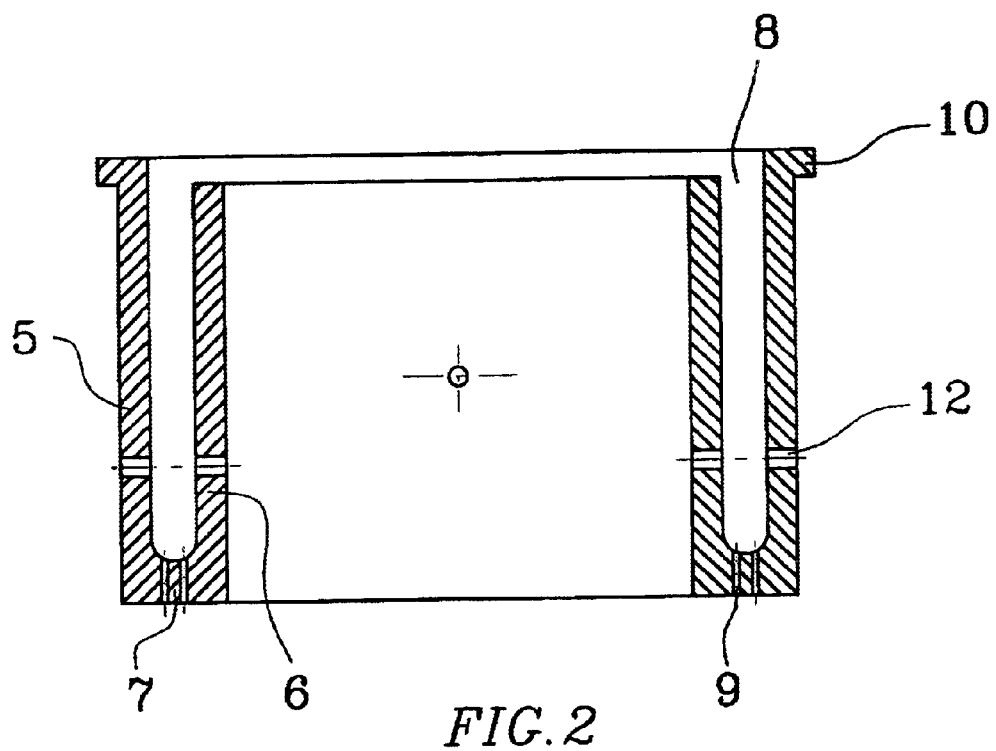
FIG. 2 is a view showing a cross-section of one container of the inventive device for training cats to go on a toilet in accordance with the present invention.
Figure 3:
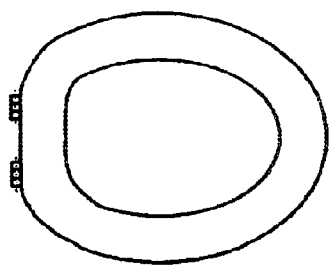
FIG. 3 is a top view of the device for training cats to go on a toilet in accordance with the present invention.

A device for training cats to go on a toilet in accordance with the present invention has a plurality of containers which are identified with reference numerals 1, 2, 3 and 4 in FIG. 1. FIG. 2 shows the container 2 as an example for the plurality of containers. The container is formed as an annular element having an outerwall 5, an inner wall 6, and a bottom wall 7 connecting the outer and inner walls with one another. A chamber 8 is formed between the outer wall 5 and the inner wall 6, for accommodating a material onto which a cat urinates and defecates. The bottom wall 7 is provided with throughgoing holes 9. On its top end, the container has a projection 10 which can be formed as an annular projection and rests on a proximal wall of a neighboring container.

When the device is installed on a toilet bowl, it can rest with the projection 10 of the outermost container on the upper surface of the toilet bowl, while the walls 5, 6 of the containers extend downwardly into the interior of the toilet bowl. During the operation, a cat sits on a top surface 11 of the device and defecates and urinates onto the surface, whereby wastes fall into the chambers 8 of the containers, and urine can escape through the throughgoing holes 9. During a training process a user removes one of the containers after the other. For example, a user removes the central container 4 thus forming a throughgoing central opening, so that a cat which sits on the upper surface 11 of the containers 1, 2, 3, can defecate and urinate into the central throughgoing opening formed by the removal of the container 4. At a next stage when a cat is used to the central opening of this size, the user removes the container 3, thus enlarging a central opening since both containers 3 and 4 are removed. Eventually, all the containers are removed with the exception of the outermost container so that a throughgoing opening with a large diameter is produced. The device can stand on the toilet bowl when necessary and the cat will defecate and urinate no longer into the corresponding material, but instead into the large central throughgoing opening, and through it into the toilet bowl. It is possible that some cats prefer to have a central support and a peripheral opening. In this case, a user removes first the container 2 to expose an opening between the containers 3, 4 and the container 1.

The containers are releasably connected with one another. For this purpose the walls of the containers can be provided with throughgoing holes 12, and a rod-shaped element 13 is removably insertable into the aligned throughgoing holes 12. There can be holes which extend perpendicular to one another, as shown in FIG. 1 for holes 12 and 14, with the rod shaped elements 13 extending through the holes 12 and through the holes 14. For this purpose the holes 14 are located at a different height than the holes 12.

In order to facilitate placement of the device on an upper rim of a toilet bowl a supporting element 15 is further provided. The supporting element 15 is disc-shaped. It has a central opening surrounding the outermost container 1, and the projection 10 on the outermost container 1 rests on the supporting element 15. In turn, the peripherally outer portion of the supporting element 15 rests on the upper rim of the toilet bowl 16. Since usually the toilet bowls have an elliptical opening, the containers 1, 2, 3, 4 can have elliptical cross-sections matching with one another. On the other hand, it is possible that the outer wall of the outermost container 1 is elliptical, while the other walls of the containers are different, since actually only the outer wall of the outermost container 1 has to match the elliptical opening of the toilet bowl.

Figure 4:
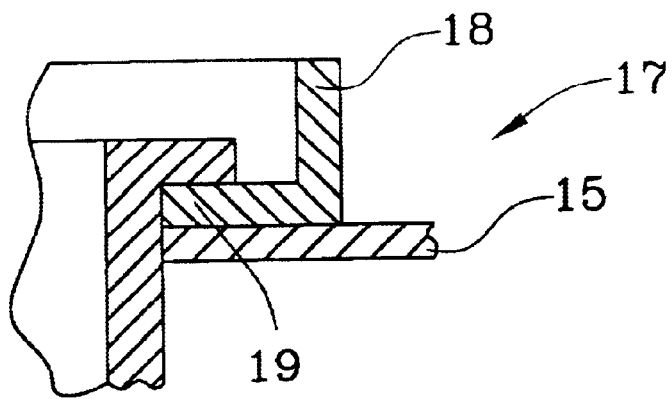
FIG. 4 is a view showing a partial cross-section of the inventive device in accordance with a further embodiment of the present invention, including a litter box.
Figure 5:
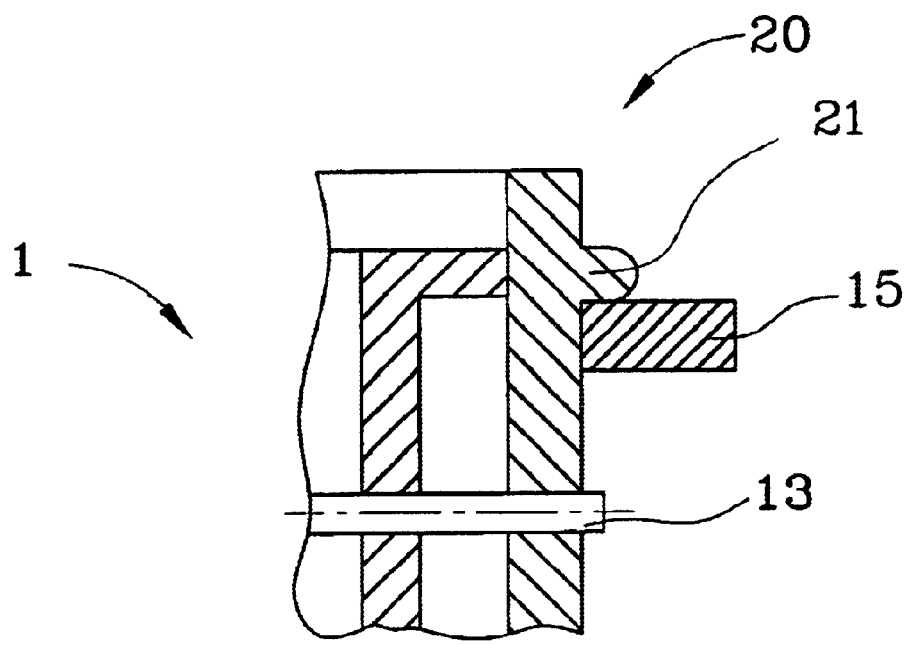
FIG. 5 is a view showing a cross-section of the device in accordance with still another embodiment, with an outer surrounding element.

In order to train cats which are used to litter boxes, the device can be provided with a litter box 17 which has a vertical wall 18 and a bottom 19 provided with a central opening with which it can be fitted on the outer peripheral surface of the outer wall 5 of the outermost container 1. The bottom 19 of the container 17 is located between the projection 10 of the outermost container 1 and the supporting element 15 as shown in FIG. 4. For those cats which use the litter boxes, the device resembles a litter box, and then is gradually modified as explained herein above by the removing containers one after the other.

The device in accordance with the present invention can have furthermore a limiting element which is identified as a whole with reference numeral 20. It is located peripherally outside of the outermost container 1 and is higher than the container 1. The limiting element 20 has a projection 21 with which it is supported on the supporting element 15. The limiting element 20 is formed so that when a cat sits on the device, he can move to the area on the supporting element is over the upwardly extended upper edge of the element 20 and therefore the cat can not urinate or defecate on the supporting element 15.

Figure 6:
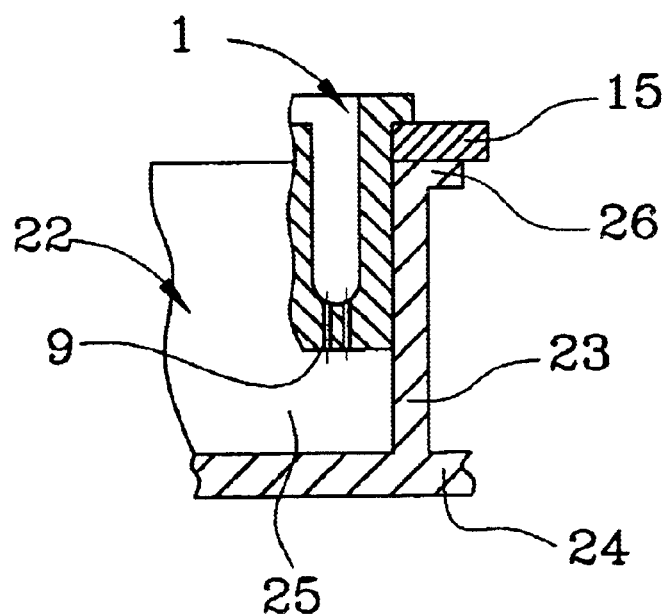
FIG. 6 is a view showing the device in accordance with still a further embodiment of the present invention, with a vessel in which said containers are inserted.

FIG. 6 shows a further embodiment of the present invention. Here the device additionally has a vessel which is identified with reference numeral 22. The vessel 22 has a vertical wall 23 on which the containers are supported, in particular the outermost container 1. The vessel 22 further has a closed bottom 24. The vertical wall 23 and the closed bottom 24 together form an enclosed chamber 25 which is open only from the top. The vessel 22 is used when it is desirable not to install the device on a toilet bowl, but instead on a floor of a toilet room, on a floor in other places, for example during transportation, etc. When the animal urinates or defecates on the upper surface of the containers, the waste passes through the throughgoing holes 9 into the inner chamber 25 of the vessel 22. The vessel 22 has an outwardly extending flange 26 arranged so that the supporting element 15 is supported on the flange 26 of the vessel 22.

Figure 7:
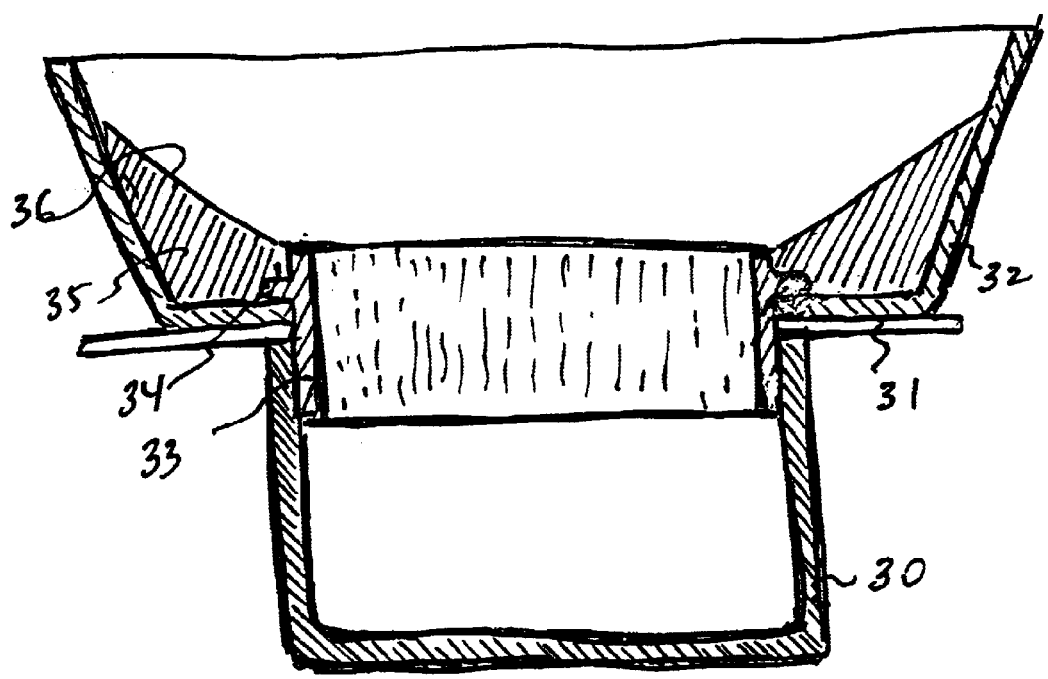
FIG. 7 is a view showing the device in accordance with still a further embodiment of the present invention, with a vessel in which said containers are inserted.

In the embodiment shown in FIG. 7, the device has a vessel 30, a supporting element 31 placed on an upper edge of the vessel 30, a tray 32 resting on the supporting element 31, and a ring-shaped element 33 having a projection 34 resting on a bottom of the tray 32. An insert 35 is arranged in the interior of the tray and has an inner inclined surface 36 for falling of wastes down. A set of containers shown in FIG. 1 is inserted into the inner opening of the ring-shaped element 33 and operates in the same way.

During transportation, the containers can be filled not with conventional litter material which can fall out, but by plastic beads (for example on a line) as shown in the right part of FIG. 1.

It will be understood that each of the elements described above, or two or more together, may also find a useful application in other types of constructions differing from the types described above.

While the invention has been illustrated and described as embodied in device for training cats to go on the toilet, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for training cats to go on the toilet, comprising a plurality of containers each having a hollow for accommodating a material onto which a cat urinate or defecate, said containers being inserted into one another and having upper horizontal surfaces extending in a same horizontal plane and forming a common horizontal upper surface on which a cat can stand or sit, said containers being removable from one another so as to expose a throughgoing opening through which a cat can urinate or defecate, said containers being removable independently from one another so as to gradually expose throughgoing openings of different cross-sectional areas.

2. A device as defined in claim 1, wherein at least some of said containers have an inner annular cross-section with an inner wall and an outer wall connected with one another by a bottom wall.

3. A device as defined in claim 2, wherein said bottom walls are provided with a plurality of throughgoing holes.

4. A device as defined in claim 2, wherein said containers are arranged so that said inner wall of one of said containers faces said outer wall of the other of said containers.

5. A device as defined in claim 2, wherein one of said walls of each of said containers is shorter than the other wall of each of said containers.

6. A device as defined in claim 1, wherein at least one of said walls of each of said containers has a transverse projection adapted to rest on at least one of said walls of a neighboring one of said containers.

7. A device as defined in claim 1; and further comprising means for holding said containers together.

8. A device as defined in claim 1; and further comprising means for supporting said containers on a toilet seat and including a support element extending transversely outwardly of an outermost one of said containers.

9. A device as defined in claim 1; and further comprising an additional vessel having a peripheral wall and a bottom, forming a chamber in which said containers can be accommodated so that when a cat urinates or defecates waste is accumulated in said vessel.

10. A device as defined in claim 9, wherein said vessel has a depth which exceeds a height of said containers.

11. A device as defined in claim 9, and further comprising an insert arranged in said vessel and surrounding said containers, said insert having an inner inclined surface for falling wastes downwardly toward said containers.

12. A device as defined in claim 1; and further comprising plastic beads for filling said containers during transportation.

13. A device for training cats to go on the toilet, comprising a plurality of containers each having a hollow for accommodating a material onto which a cat urinate or defecate, said containers being inserted into one another so as to form upper surface on which a cat can stand or sit, said containers being removable from one another so as to expose a throughgoing opening through which a cat can urinate or defecate, said containers being removable independently from one another so as to gradually expose throughgoing openings of different cross-sectional areas; and further comprising means for holding said container together, said means for holding said containers together including at least two throughgoing holes provided in said walls of said containers, and an elongated element extending through the throughgoing holes.

14. A device for training cats to go on the toilet, comprising a plurality of containers each having a hollow for accommodating a material onto which a cat urinate or defecate, said containers being inserted into one another so as to form an upper surface on which a cat can stand or sit, said containers being removable from one another so as to expose a throughgoing opening through which a cat can urinate or defecate, said containers being removable independently from one another so as to gradually expose throughgoing openings of different cross-sectional areas; and further comprising means for supporting said containers on a toilet seat and including a support element extending transversely outwardly of an outermost one of said containers, said supporting means including a supporting element having a central opening with which it is fitted on a peripheral surface of said outermost container.

15. A device for training cats to go on the toilet, comprising a plurality of containers each having a hollow for accommodating a material onto which a cat urinate or defecate, said containers being inserted into one another so as to form an upper surface on which a cat can stand or sit, said containers being removable from one another so as to expose a throughgoing opening through which a cat can urinate or defecate, said containers being removable independently from one another so as to gradually expose throughgoing openings of different cross-sectional areas; means for supporting said containers on a toilet seat and including a support element extending transversely outwardly of an outermost one of said containers; and further comprising a litter box having an opening and having a portion located between said outermost container and said supporting element.

16. A device as defined in claim 15, wherein said outermost container has a transversely extending projection arranged so that said litter box is located between said projection and said supporting element.

17. A device for training cats to go on the toilet, comprising a plurality of containers each having a hollow for accommodating a material onto which a cat urinate or defecate, said containers being inserted into one another so as to form an upper surface on which a cat can stand or sit, said containers being removable from one another so as to expose a throughgoing opening through which a cat can urinate or defecate, said containers being removable independently from one another so as to gradually expose throughgoing openings of different cross-sectional areas; means for supporting said containers on a toilet seat and including a support element extending transversely outwardly of an outermost one of said containers; and further comprising an exterior element which peripherally surround an outermost one of said containers and is taller than said containers, so as to prevent a cat from urinating or defecating on said supporting means.

* * * * *